3,819,622
Patented June 25, 1974

3,819,622
METHOD OF PRODUCING 7β - ACYLAMIDO-3-METHYLCEPH-3-EM - 4 - CARBOXYLIC ACID ESTERS
Brian Richard Cowley, Greenford, William Graham Pinner, David Cedric Humber, Greenford, Lewis Aubrey Wetherill, North Wembley, and William James White, London, England, assignors to Glaxo Laboratories Limited, Greenford, England
No Drawing. Continuation of abandoned application Ser. No. 18,285, Mar. 10, 1970. This application July 17, 1972, Ser. No. 272,199
Claims priority, application Great Britain, Mar. 11, 1969, 12,865/69
Int. Cl. C07d 99/24
U.S. Cl. 260—243 C                                10 Claims

ABSTRACT OF THE DISCLOSURE

The invention relates to a process for the preparation of 7β - acylamido - 3 - methylceph-3-em-4-carboxylic acid esters from 6β - acylamido - penicillanic acid 1-oxide esters in the presence of an acid catalyst in advantageous yields by careful selection of the solvent used in the reaction, the acid catalyst and the temperature and duration of the reaction.

---

This is a continuation of application Ser. No. 18,285, filed Mar. 10, 1970 and now abandoned.

This invention is concerned with an improved process for obtaining cephalosporin compounds. In particular the invention is concerned with the conversion of penicillin type compounds into cephalosporin type compounds.

The compounds referred to in this specification are generally named with reference to penicillanic acid and cepham. Penicillanic acid has the structure:

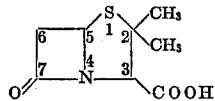

and cepham has the structure:

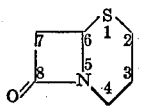

(see J.A.C.S., 1962, 84, 3400 and J. Chem. Soc., 1965, 5031). The term "cephem" refers to the basic cepham structure with a single olefinic double bond.

Cephalosporin antibiotics are of great interest in that a number of them are of value in the treatment of infections caused by pathogenic bacteria some of which are resistant to other antibiotics. Penicillin compounds are, currently, produced in greater quantities on an industrial scale than are cephalosporin compounds and with the continually increasing interest in cephalosporin compounds it is highly desirable to have available alternative techniques for producing the latter such as a simple process for converting compounds of the penicillin type into cephalosporins.

The invention is thus principally concerned with the conversion of 6β-acylamidopenicillanic acid 1 - oxide esters into 7β-acylamido-3-methyl-ceph-3-em-4-carboxylic acid esters.

In U.S. Pat. No. 3,275,626 there is described a general method for preparing antibiotic substances, including cephalosporins, which comprises heating a so-called penicillin sulphoxide, under acid conditions, to a temperature of from about 100° C. to about 175° C.

We have now found that yields of cephalosporin compounds considerably in excess of those which appear to be obtained in the reaction described in U.S. Pat. No. 3,275,626 may be obtained by careful selection of (A) the solvent used in the reaction, (B) the acid catalyst and (C) the temperature and duration of the reaction. (C) will be dependent, to some extent at least, on the particular choice of solvent and catalyst.

According to the present invention therefore there is provided a process for the preparation of 7β-acylamido-3-methyl-ceph-3-em-4-carboxylic acid esters comprising rearranging a 6β-acylamidopenicillanic acid 1-oxide ester (referred to herein for convenience as the penicillin oxide) in the presence of an acid catalyst which is a hydrocarbyl (e.g. alkyl, aralkyl or aryl) sulphonic acid (e.g. methane sulphonic acid or p-toluene sulphonic acid) or a phosphorous acid (e.g. orthophosphoric, polyphosphoric or pyrophosphoric, phosphorous or a phosphonic acid) and a solvent which is selected from ketones boiling at from 75–120° C. (e.g. 100–120° C.), esters boiling at from 75–140° C. (e.g. 100–130° C.), dioxan (in which solvents the reaction is effected for a time of at least 2 hours at a temperature of from about 75° C. to about 110° C. and for at least 45 minutes at higher temperatures) and diethylene glycol dimethyl ether (diglyme). The reaction is preferably effected at the boiling point of the solvent.

The phosphonic acid may be an aliphatic, araliphatic or aryl phosphonic acid; the aliphatic, araliphatic or aryl group of such a phosphonic acid may be a hydrocarbon group (e.g. a lower alkyl, phenyl lower alkyl or phenyl group) or a hydrocarbon group substituted by, for example, a halogen atom or a nitro group. Examples of aliphatic phosphonic acids include the lower alkyl and substituted (e.g. halogeno) lower alkyl phosphonic acids such as methane phosphonic acid, ethane phosphonic acid, dichloromethane phosphonic acid, trichloromethane phosphonic acid and iodomethane phosphonic acid. Examples of aryl phosphonic acids include the benzene and substituted (e.g. halogeno or nitro) benzene phosphonic acids, e.g. bromobenzene phosphonic acids and nitrobenzene phosphonic acids.

The proportion of the acid catalyst used preferably should not exceed 1.0 mole per mole of the penicillin oxide. We prefer to use about 0.2 mole when using dioxan as solvent and 0.05 to 0.1 mole when using a ketone or an ester as solvent.

The time for achieving optimum yields varies according to factors such as the temperature employed. The rearrangements are conveniently carried out at the boiling point of the chosen solvent and, for those solvents boiling in the lower part of the ranges quoted above, correspondingly longer reaction times, e.g. up to 48 hours, may be required than for those ketones and esters boiling at higher temperatures. Rearrangements in dioxan generally require times of 10–15 hours to achieve optimum results. The yields in the rearrangements are dependent, but to a lesser extent, on the concentration of the acid catalyst in the solvent, correspondingly longer reaction times being required for lower concentrations of acid catalyst.

Illustrative of those ketones and esters that may be used in the process according to the invention are aliphatic ketones and esters having appropriate boiling points including ethyl methyl ketone, isobutyl methyl ketone, methyl n-propyl ketone, n-propyl acetate, n-butyl acetate, iso-butyl acetate, sec-butyl acetate and diethyl carbonate.

The appropriate time interval for any particular reaction may be determined by testing the reaction solution by one or more of the following procedures:

(1) Thin layer chromatography, for example on silica gel, developing with a 2:1 mixture of benzene and ethyl acetate and rendering the spots visible by treatment with an iodine/azide solution (Russell, Nature, 1960, 186, 788). Where, for example, the starting material is the 2,2,2-trichloroethyl ester of 6β-phenylacetamidopenicillanic acid 1β-oxide, the product ($R_F$ 0.65) gives an orange/brown colour whereas the starting material ($R_F$ 0.5) gives a dark yellow colour.

(2) Determination of the rotation after suitable dilution of the reaction mixture with, for example, chloroform. Using the same starting material as in (1) the rotation drops to between about a third to a quarter of the initial value.

(3) Determination of the ultraviolet spectrum of a sample of the reaction mixture suitably diluted with ethyl alcohol. Using the same starting material as in (1) the calculated value for $$E^{1\%}_{1\,cm.}$$

at 264 nm. rises to about 100 for a successful reaction. Absorption maxima at higher wavelengths are preferably low or absent. This determination cannot be adopted when ketonic solvents are used as the reaction media.

Although satisfactory yields can be obtained by carrying out the reaction under normal reflux, it may be possible to improve the yields by inserting a desiccating agent (e.g. alumina, calcium oxide, sodium hydroxide or molecular sieves) which is inert to the solvent in the reflux return line to remove water formed during the reaction.

After completion of the reaction it is desirable to remove the acid catalyst before concentrating the reaction mixture. If the reaction solvent is immiscible with water, acids can be removed by a simple washing procedure. On the other hand, if the reaction medium is miscible with water a convenient method of removing the acid catalyst is to treat the reaction mixture with a finely divided neutralising agent such as calcium carbonate or magnesium oxide, followed by filtration in the presence of a filter aid. The reaction solvent is then removed, conveniently under reduced pressure, and the residue purified by any convenient process e.g. chromatography on silica gel. It has been found, however, that the degree of conversion achieved by the process according to the invention may be such that complicated purification procedures can be dispensed with and the product isolated in a substantially pure condition after a simple crystallisation process, incorporating a colour removal step by means of charcoal if required.

The product may be isolated by pouring the reaction mixture into water, filtering off the product and, if desired, further purifying by a recrystallisation from or slurrying with a suitable solvent.

The penicillin oxide used as stating material in the process according to the invention may be formed from a salt of 6β-phenylacetamidopenicillanic acid or of 6β-phenoxyacetamidopenicillanic acid, derived from a fermentation process, by esterification of the carboxyl group at the 3-position and oxidation of the sulphur atom at the 1-position. Alternatively the penicillin oxide may be obtained from 6β-aminopenicillanic acid or ester by acylation of the amino group at the 6β-position, esterification of the carboxyl group at the 3-position, and oxidation of the sulphur at the 1-position.

The oxidation may be carried out as described by Chow, Hall and Hoover (J. Org. Chem., 1962, 27, 1381). The penicillin compound is mixed with the oxidising agent in an amount such that at least one atom of active oxygen is present per atom of thiazolidine sulphur. Suitable oxidising agents include metaperiodic acid, paracetic acid, monoperphthalic acid, m-chloroperbenzoic acid and t-butylhypochlorite, the latter being preferably used in admixture with a weak base, e.g. pyridine. Excess oxidising agents may lead to the formation of 1,1-dioxide. The 1-oxide may be obtained in the α- and/or β-form.

The acyl group at the 6β-amino position of the penicillin oxide may be any desired acyl group especially if it is reasonably stable under the conditions of the rearrangement. Conveniently the acyl group is that of a penicillin obtained by a fermentation process, e.g. phenylacetyl or phenoxyacetyl. Such a group may not be the desired group in the cephalosporin end-product but this can be obviated by subsequent transformations described below. Another acyl group which may conveniently be used is the formyl group.

Alternatively, the acyl group at the 6β-position of the penicillin oxide may be that desired in the cephalosporin compound, e.g. a thienylacetyl or phenylglyoxyl group, or it may be a precursor for the desired acyl group, e.g. an acyl group containing a protected functional group such as a protected amino group. An example of such an acyl group is a protected α-aminophenylacetyl group.

The amine-protecting group is conveniently one which can subsequently be removed by hydrolysis without affecting the rest of the molecule, especially the lactam and 7β-amido linkages of the resulting cephalosporin compound. The same or a different protecting group may also be used as the esterifying group at the 3-COOH position and both groups can be simultaneously removed as desired. An advantageous procedure is to remove both groups at the last stage in the sequence. Protected groups include urethane, arylmethyl (e.g. trityl)-amino, arylmethylene-amino, sulphenyl-amino and enamine types. Such groups can in general be removed by one or more reagents selected from dilute mineral acids, e.g. dilute hydrochloric acid, concentrated organic acids, e.g. concentrated acetic acid, trifluroacetic acid, and liquid hydrogen bromide at very low temperature e.g. −80° C. A convenient protecting group is the t-butoxycarbonyl group, which is readily removed by hydrolysis with dilute mineral acid, e.g. dilute hydrochloric acid, or preferably with a strong organic acid (e.g. formic acid or trifluoroacetic acid), e.g. at a temperature of 0–40° C. preferably at room temperature (15–25° C.). Another convenient protecting group is the 2,2,2-trichloroethoxycarbonyl group which may be split off by an agent such as zinc in acetic acid, formic acid, lower alcohols or pyridine.

The ester of the penicillanic acid is preferably formed with an alcohol or phenol which may readily be split off, e.g. by hydrolysis or reduction, at a later stage to yield the subsequently formed ceph-3-em compound as the free acid. Alcohol and phenol residues which may readily be split off include those containing electron-attracting substituents for example sulpho groups and esterified carboxyl groups, these groups may be subsequently split off by alkaline reagents. Benzyl and o-benzyloxyphenoxy ester groups may be removed by hydrogenolysis although this may involve catalyst poisoning. A preferred method of removal involves acid cleavage and groups which may be removed by acid cleavage include adamantyl, t-butyl, benzyl residues such as anisyl and the residues of alkanols containing electron donors in the α-position such as acyloxy, alkoxy, benzoyloxy, substituted benzoyloxy, halogen, alkylthio, phenyl, alkoxyphenyl or aromatic heterocyclic. These radicals may be derived from benzyl alcohols such as p-methoxybenzyl alcohol, di-p-methoxyphenylmethanol, triphenylmethanol, diphenylmethanol, benzoyloxymethanol, benzoylmethanol, p-nitrobenzyl alcohol and furfuryl alcohol.

Alcohol residues which may be readily split off subsequently by a reducing agent are those of a 2,2,2-trihalogenoethanol, e.g. 2,2,2-trichloroethanol, p-nitrobenzyl alcohol or 4-pyridylmethanol. 2,2,2-trihalogenoethyl groups may conveniently be removed by zinc/acetic acid, zinc/formic acid, zinc/lower alcohol or zinc/pyridine or by chromous reagents; p-nitrobenzyl groups may conveniently be removed by hydrogenolysis and 4-pyridylmethyl groups may conveniently be removed by electrolytic reduction.

Where the ester group is subsequently removed by an acid catalysed reaction, this may be effected by using formic acid or trifluoroacetic acid (preferably in conjunction with anisole) or alternatively by using hydrochloric acid e.g. in admixture with acetic acid.

We particularly prefer to use those penicillin oxides having a diphenylmethoxycarbonyl, a 2,2,2-trichloroethoxycarbonyl, a t-butoxycarbonyl, a p-nitrobenzyloxycarbonyl, a benzoylmethoxycarbonyl or a p-methoxybenzylocarbonyl group at the 3-position in the proces benzyloxycarbonyl group at the 3-position in the process according to the invention because the ceph-3-em compounds formed from esters of this type do not appear to undergo appreciable $\Delta^3 \rightarrow \Delta^2$ isomerisation in the de-esterification reaction.

Where the product of the rearrangement is a 7β-acylamidoceph-3-em compound not having the desired acyl group, the 7β-acylamido compound may be N-deacylated if desired after reactions elsewhere in the molecule, to yield the corresponding 7β-amino compound and the latter acylated with an appropriate acylating reagent.

Methods of N-deacylating cephalosporin derivatives having 7β-acylamido groups are known and one suitable method comprises treating a 7β-acylamidoceph-3-em-4-carboxylic acid ester with an imide-halide forming component, converting the imide halide so obtained into the imino ether and decomposing the latter. If desired, the ester group may be split off by hydrolysis or hydrogenolysis to yield the 4-carboxylic acid. Suitable readily removable ester groups are described above.

Suitable imide halide forming components include acid halides derived from the phosphorus acids, the preferred compounds being the chlorides such as, for example, phosphorus oxychloride or phosphorus pentachloride.

This method of N-deacylation is described in greater detail in Belgian Pat. No. 719,712. N-deformylation of a 7β-formamido group may be effected with a mineral acid at a temperature of minus 15° to 100° C., preferably +15 to 40° C. A convenient reagent for the N-deformylation is concentrated hydrochloric acid in methanol or, preferably, in dioxan or tetrahydrofuran since undesirable transesterification reactions that tend to occur in methanol are thereby avoided.

In order that the invention may be well understood the following examples are given by way of illustration only.

In the examples, unless otherwise stated thin layer chromatography (TLC) was carried out on silica gel using a mixture of benzene and ethyl acetate (2:1) as the developing solvent and detecting the spots with iodine/azide solution.

EXAMPLE 1

2,2,2-trichloroethyl 6β - phenylacetamidopenicillanate 1β-oxide (4.82 g., 10 mmole) was dissolved in dioxan (250 ml.) containing methane sulphonic acid (96 mg., 1 mmole) and the solution heated under reflux. The condensed vapour was passed through molecular sieves (Linde type 4A, 1/16″ pellets, 40 g.) before being returned to the reaction flask. The reaction mixture was heated under reflux for 9 hours, additional portions of methane sulphonic acid (96 mg.) being added after 3 and 6 hours. The reaction mixture was cooled, the dioxan removed *in vacuo* and the residue taken up in ethyl acetate (200 ml.) and washed successively with water, 3% sodium bicarbonate solution and saturated brine (100 ml. of each). The solution was dried and evaporated to give a brown foam. This was dissolved in benzene:ethyl acetate (19:1) and chromatographed on silica gel (200 g.). The column was eluted first with the same solvent mixture and then using a ratio of 9:1 and finally a ratio of 4:1. From the later column runnings there was obtained a brown gel (3.35 g.) which was crystallised from ether (100 ml.) to give 2,2,2-trichloroethyl 3-methyl-7β-phenylacetamidoceph-3-em-4-carboxylate (2.06 g., 40.5% of theory); m.p. 160–2°; $[\alpha]_D^{22}$ +53° (c., 0.98 in CHCl$_3$); $\lambda_{max.}$ (ethanol) at 258–264 nm.

($E_{1\,cm}^{1\%}$ 125).

EXAMPLE 2

2,2,2-trichloroethyl 6β - phenylacetamidopenicillanate 1β-oxide (19.3 g.) was dissolved in warm isobutyl methyl ketone (800 ml.). Orthophosphoric acid solution (d. 1.75; 0.18 ml., 0.0725 molar equivalents) was added and the mixture was refluxed for 4¼ hours. After slight cooling below the boiling point, calcium carbonate (Calofort "U," 6 g.) and charcoal (SS 110, 6 g.) were added. The mixture was stirred for 20 minutes and simultaneously cooled to 35°. The charcoal and calcium salts were removed by filtration and washed with isobutyl methyl ketone (75 ml.). The combined filtrate and wash were evaporated to dryness and the residue was treated with warm industrial methylated spirit (40 ml.) to give a crystalline solid. The mixture was refrigerated overnight and the solid was collected by filtration, washed with industrial methylated spirits (10 ml.) and diethyl ether (20 ml.) and dried at 40° *in vacuo* to give 2,2,2-trichloroethyl-3-methyl - 7β - phenylacetamidoceph - 3-em-4-carboxylate (8.25 g., 44.4% of theory); $[\alpha]_D$ +52.5° (c. 1.0, CHCl$_3$); m.p. 161–2°.

EXAMPLE 3

2,2,2 - trichloroethyl 6β-phenylacetamidopenicillanate 1β-oxide (4.82 g.) was dissolved in warm isobutyl methyl ketone (100 ml.). Orthophosphoric acid solution (d. 1.75; 0.06 ml., 0.097 molar equivalents) was added and the mixture was refluxed for 3 hours. Work-up was carried out in a manner analogous to that described in Example 2, except that the isolation was from isopropanol/diethylether, to yield 2,2,2-trichloroethyl 3-methyl-7β-phenylacetamidoceph-3-em-4-carboxylate (1.81 g., 39% of theory); m.p. 159.5°–160.5°; single spot on TLC.

EXAMPLE 4

2,2,2 - trichloroethyl 6β-phenylacetamidopenicillanate 1β-oxide (4.82 g.) was dissolved in warm isobutyl methyl ketone (250 ml.) and methane sulphonic acid (d. 1.48; 0.064 ml., 0.1 of a molar equivalent) added. The mixture was heated at reflux for 2.2 hours, a second aliquot (0.064 ml.) of methane sulphonic acid being added after 1.5 hours. The condensed vapours were returned to the reaction flask after passing through molecular sieves (Linde, type 4A, 1/16″ pellets, 50 g.).

After cooling, the reaction mixture was washed with saturated aqueous sodium hydrogen carbonate (2× 100 ml.) and water (100 ml.). The organic phase was dried over anhydrous sodium sulphate, then stirred with charcoal (1.5 g.) for 20 mins. The charcoal was filtered off and the solvent removed under reduced pressure. The crude brown oil was triturated until solid with hot ether (40 ml.) and after cooling the 2,2,2 - trichloroethyl-3-methyl - 7β-phenylacetamido-ceph-3-em-4-carboxylate filtered off and washed with a little cold ether.

Yield 1.25 g. (27.0% of theory); m.p. 159.5–160° C.; single spot on TLC.

EXAMPLE 5

2,2,2 - trichloroethyl 6β - phenylacetamidopenicillanate 1β-oxide (4.82 g., 10 mmole) was dissolved in dioxan (200 ml.) and methane sulphonic acid (96 mg., 1 mmole) added. The solution was brought to reflux with the condensate returning to the reaction vessel via a column filled with molecular sieves (Linde, Type 4A, 1/16″ pellets, 20 g.). Further methane sulphonic acid (96 mg., 1 mmole) was added at 1.5 and 3.5 hours. After 8.5 hours reflux, the reaction mixture was cooled slightly and finely divided calcium carbonate (2 g.) added. The mixture was refluxed for several minutes, cooled to 60°, and the solid filtered off. The bed was washed with dioxan (2× 15 ml.) and the solvent removed from the combined filtrate and washings *in vacuo* at 65° to give a gum. This gum was triturated with petrol 60°–80° (20 ml.), the liquors decanted and the residue dissolved in ethyl acetate (40 ml.). Charcoal (1.7 g.) was added and the mixture stirred for several minutes at room temperature. The charcoal was filtered off and the bed washed with ethyl acetate (2× 20 ml.). The solvent was removed from the combined filtrate and washings *in vacuo* at 50° to leave a gel. Treatment of this gel with ether (25 ml.) gave a white crystalline solid. After cooling the mixture at 0° for 30 minutes, the product was filtered off, washed with ether (2× 15 ml.), and dried in vacuo at room temperature to give 2,2,2-trichloroethyl 3 - methyl - 7β - phenylacetamidoceph-3-em-4-carboxylate (1.58 g., 34.1% theory). TLC single spot, $R_F$ 0.61; m.p. 161–165°; $[\alpha]_D$ +51.7° (c. 1.14, CHCl$_3$); $\lambda_{max.}$ (ethanol) at 264 nm.

($E^{1\%}_{1cm.}$ 139).

EXAMPLE 6

2,2,2 - trichloroethyl 6β-phenylacetamidopenicillanate 1β-oxide (2.41 g., 5 mmole) was boiled under reflux in n-propyl acetate (100 ml.) containing 88% w./v. orthophosphoric acid (0.065 ml., 0.2 mole equivalents) for 18 hours. The solution was neutralised with finely divided calcium carbonate (1 g.) and the solvent removed by distillation. The residual crude product was crystallised from ethanol (10 ml.) to give 2,2,2-trichloroethyl 3-methyl-7β-phenyl - acetamidoceph - 3 - em - 4 - carboxylate (0.7 g., 30.3% of theory); $[\alpha]_D$ +50.3° (c., 0.8, CHCl$_3$); m.p. 161–162°; $\lambda_{max.}$ (ethanol) at 264 nm.

($E^{1\%}_{1cm.}$ 135)

TLC single spot, $R_F$ 0.65.

EXAMPLE 7

2,2,2-trichloroethyl 6β-phenylacetamidopenicillanate 1β-oxide (4.82 g., 10 mmole) was boiled under reflux in isobutyl acetate (100 ml.) containing 88% w./v. orthophosphoric acid (0.0325 ml., 0.05 mole equivalents) with the condensate returning to the reaction flask via a column of desiccant. After 3½ hours reflux the reaction solution was neutralised with calcium carbonate (1 g.), decolourised with charcoal (1.5 g.) and concentrated to a residual foam. The crude residue was crystallised from ethanol (10 ml.) to give 2,2,2-trichloroethyl 3-methyl-7β-phenylacetamidoceph-3-em-4-carboxylate 2.1 g. (45.3% of theory); $[\alpha]_D$ +52° (c., 0.5, CHCl$_3$); m.p. 160–163°; $\lambda_{max.}$ (ethanol) at 264 nm.

($E^{1\%}_{1cm.}$ 139)

TLC single spot, $R_F$ 0.65.

EXAMPLE 8

Example 7 was repeated except that secondary butyl acetate was used as the reaction solvent. Reflux for 5 hours and work-up in analogous manner to that described in Example 7 gave 2,2,2-trichloroethyl 3-methyl-7β-phenylacetamidoceph-3-em-4-carboxylate, 2.04 g. (44% of theory); $[\alpha]_D$ +51.8° (c., 0.5, CHCl$_3$); m.p. 160–162°; $\lambda_{max.}$ (ethanol) at 264 nm.

($E^{1\%}_{1cm.}$ 136)

TLC single spot, $R_F$ 0.65.

EXAMPLE 9

Example 7 was repeated except that n-butyl acetate was used as the reaction solvent. Reflux for 2 hours and work-up in a manner analogous to that described in Example 7 gave 2,2,2-trichloroethyl 3-methyl - 7β - phenylacetamidoceph-3-em-4-carboxylate, 2.33 g. (50.3% of theory); m.p. 162–165°; $[\alpha]_D$ +50.3° (c., 0.8, CHCl$_3$); $\lambda_{max.}$ (ethanol) at 264 nm.

($E^{1\%}_{1cm.}$ 136)

TLC single spot, $R_F$ 0.65.

EXAMPLE 10

Example 7 was repeated except that diethyl carbonate was used as the reaction solvent. Reflux for 2 hours and work-up in a manner analogous to that described in Example 7 gave 2,2,2-trichloroethyl 3-methyl-7β-phenyl-acetamidoceph - 3 - em-4 - carboxylate, 2.17 g. (47% of theory); m.p. 160–162°; $[\alpha]_D$ +50.2° (c., 0.8, CHCl$_3$); $\lambda_{max.}$ (ethanol) at 264 nm.

($E^{1\%}_{1cm.}$ 134)

TLC single spot, $R_F$ 0.65.

EXAMPLE 11

2,2,2-trichloroethyl 6β - phenoxyacetamidopenicillanate 1β-oxide (2.49 g., 5 mmole) was dissolved in dioxan (125 ml.) containing methane sulphonic acid (48 mg., 0.5 mmole) and the solution heated under reflux. The condensed vapour was passed through molecular sieves (Linde type 4A, 1/16" pellets, 40 g.) before being returned to the reaction flask. The reaction mixture was heated under reflux for 9 hours, additional portions of methane sulphonic acid (48 mg.) being added after 4 and 8 hours. The reaction mixture was cooled, the dioxan removed in vacuo and the residue taken up in ethyl acetate (100 ml.) and washed successively with 3% sodium bicarbonate solution (2× 100 ml.) and water (100 ml.). The solution was dried and evaporated to give a crude product (2.475 g.) After washing the crude product obtained was dissolved in methylene chloride (20 ml.) and chromatographed on silica gel (200 g.). The column was eluted with methylene chloride containing a gradually increasing percentage of acetone. 100 ml. fractions were collected and fractions 9 to 11 (2% acetone in methylene chloride) were evaporated and treated with ether to give 0.72 g. (29.8% of theory) of 2,2,2-trichloroethyl 3-methyl - 7β - phenoxyacetamidoceph-3-em-4-carboxylate; $[\alpha]_D^{23}$ +57° (c., 1.02 in CHCl$_3$); $\lambda_{max.}$ (ethanol at 265 nm. ($E^{1\%}_{1cm.}$ 139), 268 nm. ($E^{1\%}_{1cm.}$ 145), 275 nm. ($E^{1\%}_{1cm.}$ 135).

An analytically pure sample was obtained by recrystallisation from acetone/light petroleum, m.p. 114–5°; $[\alpha]_D$ +59° (c., 1.12 in CHCl$_3$).

EXAMPLE 12

A solution of p-methoxybenzyl 6β-phenylacetamidopenicillanate 1β-oxide (2.35 g., 5 mmole) in dry dioxan (160 ml.) containing methanesulphonic acid (48 mg., 0.5 mmole) was brought to reflux so that the condensed vapour passed through molecular sieves (Linde type 4A, 1/16"; 40 g.) before returning to the reaction vessel. The reaction mixture was heated under reflux for 7.5 hours, additional portions of methanesulphonic acid (48 mg.) being added after 2 and 4.5 hours. The dioxan was removed in vacuo, and the residual brown gum was dissolved in methylene chloride (15 ml.) and chromatographed on silica gel (Merck, 0.05–0.2 mm.; 100 g.). Methylene chloride and 2% acetone in methylene chloride eluted oils soluble in ether; further elution with 5% acetone in methylene chloride gave an oil which on treatment with ether yielded p-methoxybenzyl 3-methyl-7β-phenylacetamidoceph-3-em-4-carboxylate (0.73 g., 32% of theory); $\lambda_{max.}$ (ethanol) at 267 nm.

($E^{1\%}_{1cm.}$ 148).

EXAMPLE 13

To 2,2,2- trichloroethyl 6β - phenylacetamidopenicillanate-1β-oxide (4.818 g. 0.01 mole) in dioxan (200 ml.) was added orthophosphoric acid (88% w./v., 0.196 g., 0.00196 mole) and the solution was heated to reflux. The condensed vapour was passed through a column of molecular sieves (Linde, type 4A) before being returned to the reaction flask. The solution was heated under reflux for 18 hours. Finely divided calcium carbonate (2 g.) was added to the warm solution and stirred for 10 mins., cooled and filtered. A work-up similar to that described in Example 1 except that the final isolation was from ether (25 ml.) yielded 2,2,2-trichloroethyl 3-methyl-7β-phenyl-acetamidoceph-3-em-4-carboxylate (2.6 g., 56% of theory); m.p. 164–6°; [α] +51.5° (c., 0.8 in CHCl₃); λ_max. (ethanol) at 264 nm.

($E_{1cm.}^{1\%}$ 145);

single spot TLC.

EXAMPLE 14

To 2,2,2-trichloroethyl 6β-phenylacetamidopenicillanate 1β-oxide (48.18 g., 0.1 mole) in dioxan (1 litre) was added orthophosphoric acid (88% w./v., 2.23 g., 0.02 mole) and the solution was heated to reflux. The condensed vapour was passed through a column of calcium oxide before being returned to the reaction flask. The solution was heated under reflux for 15½ hours. Finely divided calcium carbonate (5.4 g.) was added to the warm solution, which was stirred for 10 mins., cooled and filtered. The doxan was distilled off under reduced pressure and the resulting gum dissolved in ethyl acetate (500 ml.), stirred with charcoal (15 g.) for one hour and filtered. The solution was evaporated to dryness under reduced pressures and the partly solid gel triturated with ethanol (50 ml., cooled overnight and the white solid harvested by filtration to give 2,2,2-trichloroethyl 3-methyl-7β-phenylacetamidoceph-3-em-4-carboxylate (258.88 g., 55.8% of theory); m.p. 161–4°; [α] +51.8° (c., 0.8 in CHCl₃); λ_max. (ethanol) at 264 nm.

($E_{1cm.}^{1\%}$ 136);

TLC one spot.

EXAMPLE 15

2,2,2-trichloroethyl 6β-phenylacetamidopenicillanate 1β-oxide (2.41 g., 5 mmoles) was dissolved in dioxan (80 ml.). Anhydorus toluene-p-sulphonic acid (86.1 mg., 0.1 mole equivalent) was added. The mixture was boiled under reflux with the condensate returned to the reaction flask through a column of molecular sieves (Linde Type 4A 1/16" pellets; 10 g.). Further additions of anhydrous toluene-p-sulphonic acid (each 0.1 mole equivalent) were made after 2 and 3½ hours. After a total reaction time of 5½ hours the product was isolated as in Example 5 to give 2,2,2-trichloroethyl 3-methyl-7β-phenylacetamidoceph-3-em-4-carboxylate (0.54 g., 23.4% of theory); m.p. 161–3°; [α]_D²² +51.8° (c., 0.8 CHCl₃); λ_max. (ethanol) at 258–264 nm.

($E_{1cm.}^{1\%}$ 130).

Single spot on TLC, R_F 0.65.

EXAMPLE 16

A solution of diphenylmethyl 6β-phenylacetamidopenicillanate 1β-oxide (5.16 g., 10 mmole) in dry diglyme (20 ml.) was added to a gently distilling solution of methanesulphonic acid (96 mg., 1 mmole) in dry diglyme (~180 ml.). Distillation was continued for 15 minutes when the reaction mixture was cooled to room temperature and filtered through a column of silica gel (100 g.). Elution with ethyl acetate was continued to give an eluate (500 ml.) which was evaporated in vacuo to a brown gelatinous solid. This solid was stirred and triturated with ether (ca. 200 ml.) to give diphenylmethyl 3-methyl-7β-phenylacetamidoceph-3-em-4-carboxylate (1.48 g., 30% of theory); λ_max. (ethanol) at 258 nm.

($E_{1cm.}^{1\%}$ 138).

EXAMPLES 17–21

Using a variety of catalysts 2,2,2-trichloroethyl 6β-phenylacetamidopenicillanate 1β-oxide was converted into 2,2,2-trichloroethyl 3-methyl-7β-phenylacetamidoceph-3-em-4-carboxylate under the conditions and in the yields summarized in Table 1.

TABLE 1

| Example number | Catalyst | Mol. equiv. | Solvent at B.P. | Conc. of pen oxide, percent | Time, hrs. | Yield, percent of theory |
|---|---|---|---|---|---|---|
| 17 | Methane phosphonic acid | 0.6 | Dioxan | 5 | 18.5 | 39.7 |
| 18 | Ethane phosphonic acid | 0.6 | do | 5 | 16 | 49.6 |
| 19 | Iodomethane phosphonic acid | 0.2 | do | 5 | 16 | 54.6 |
| 20 | Trichloromethane phosphonic acid | 0.2 | do | 5 | 16 | 39 |
| 21 | o-Bromobenzene phosphonic acid | 0.25 | do | 5 | 19 | 42 |

We claim:

1. In a process for the preparation of a 7β-acylamido-3-methylceph-3-em-4-carboxylic acid ester by heating a 6β-acylamidopenicillanic acid 1-oxide ester in a solvent in the presence of an acid catalyst, the improvement which comprises employing as catalyst, an acid selected from the group consisting of methane sulphonic acid; p-toluene sulphonic acid; orthophosphoric acid; polyphosphoric acid; phosphorous acid; a hydrocarbyl phosphonic acid in which the hydrocarbyl radical is lower alkyl, phenyl lower alkyl or phenyl; and said hydrocarbyl phosphonic acid in which the hydrocarbyl radical is substituted by a chlorine, bromine or iodine atom or a nitro group and as solvent, a solvent selected from the group consisting of ethyl methyl ketone, isobutyl methyl ketone, methyl n-propyl ketone, n-propyl acetate, n-butyl acetate, iso-butyl acetate, sec-butyl acetate, diethyl carbonate, dioxan in which solvents the reaction is effected for a time of at least 2 hours at a temperature of from 75 to 110° C. and for at least 45 minutes at higher temperatures and diethylene glycol dimethyl ether.

2. A process as defined in claim 1 wherein said catalyst is selected from the group consisting of methane sulphonic acid and p-toluene sulphonic acid.

3. A process as defined in claim 1 wherein said catalyst is orthophosphoric acid, pyrophosphoric acid, phosphorous acid or said phosphonic acid.

4. A process as defined in claim 1 wherein said catalyst is selected from the group consisting of a lower alkyl phosphonic acid and a chloro-, bromo- or iodo-substituted lower alkyl phosphonic acid.

5. A process as defined in claim 1 wherein said catalyst is selected from the group consisting of methane phosphonic acid, ethane phosphonic acid, dichloromethane phosphonic acid, trichloromethane phosphonic acid and iodomethane phosphonic acid.

6. A process as defined in claim 1 wherein said catalyst is selected from the group consisting of benzene, chloro-, bromo- or iodo-benzene and nitro-benzene phosphonic acid.

7. A process as defined in claim 1 in which a proportion of acid catalyst not exceeding 1.0 mole per mole of pencillin oxide is used.

8. A process as defined in claim 7 wherein the solvent is dioxan and the concentration of said acid catalyst is about 0.2 mole per mole of penicillin oxide.

9. A process as defined in claim 7 wherein the solvent is ethyl methyl ketone, isobutyl methyl ketone, methyl n- propyl ketone, n-propyl acetate, n-butyl acetate, iso-butyl acetate, sec-butyl acetate or diethyl carbonate and the concentration of said acid catalyst is from 0.05 to 0.1 mole per mole of penicillin oxide.

10. A process as defined in claim 1 in which the reaction is effected at the boiling point of said solvent and wherein a desiccating agent, which is inert under the reaction conditions, is inserted in a reflux return line to remove water formed during the reaction.

References Cited

UNITED STATES PATENTS

| 3,668,201 | 6/1972 | Foster et al. | 260—239.1 |
| 3,668,202 | 6/1972 | Gutowski | 260—239.1 |

NICHOLAS S. RIZZO, Primary Examiner

U.S. Cl. X.R.

424—246